US006973463B2

(12) United States Patent
Merrells et al.

(10) Patent No.: US 6,973,463 B2
(45) Date of Patent: Dec. 6, 2005

(54) REPLICATION ARCHITECTURE FOR A DIRECTORY SERVER

(75) Inventors: John Merrells, Mountain View, CA (US); Olga Natkovich, Sunnyvale, CA (US); Gordon Good, Mountain View, CA (US); Rich Megginson, Albuquerque, NM (US); Ludovic Poitou, Meylan (FR); Mark C. Smith, Saline, MI (US)

(73) Assignee: Sun Microsystems, Inc., Santa Clara, CA (US)

( * ) Notice: Subject to any disclaimer, the term of this patent is extended or adjusted under 35 U.S.C. 154(b) by 617 days.

(21) Appl. No.: 09/993,940

(22) Filed: Nov. 6, 2001

(65) Prior Publication Data

US 2003/0088587 A1 May 8, 2003

(51) Int. Cl.⁷ .............................................. G06F 17/00
(52) U.S. Cl. .................. 707/201; 707/10; 707/100
(58) Field of Search .............................. 707/1, 2, 8–10, 707/100–104.1, 200–205; 709/200–206, 709/217–219; 711/100, 112, 117

(56) References Cited

U.S. PATENT DOCUMENTS

| 5,434,994 | A | * | 7/1995 | Shaheen et al. ............ 709/223 |
| 5,774,552 | A |   | 6/1998 | Grimmer |
| 5,893,116 | A |   | 4/1999 | Simmonds, et al. |
| 6,044,444 | A |   | 3/2000 | Ofek |
| 6,157,942 | A |   | 12/2000 | Chu, et al. |
| 6,397,329 | B1 | * | 5/2002 | Aiello et al. ................. 713/155 |
| 6,615,223 | B1 | * | 9/2003 | Shih et al. ................... 707/201 |
| 6,647,393 | B1 | * | 11/2003 | Dietterich et al. .......... 707/102 |
| 6,782,398 | B1 | * | 8/2004 | Bahl ........................... 707/200 |

FOREIGN PATENT DOCUMENTS

EP        0 684 558 A1    11/1995
WO       WO 95/14279       5/1995

OTHER PUBLICATIONS

Cai et al., U.S. Patent Application Publication No. 2001/0016880, Aug. 23, 2001.*
Stokes et al., "The LDUP Replication Update Protocol", http://www.ietf.org/proceedings/00dec/I-D/draft-ietf-Idup-protocol-02.txt Jul. 15, 2000.*
Combined Search and Examination Report; Jul. 3, 2003.
Netscape Communications Corporation; "Chapter 12—Managing Replication"; Administrator's Guide—Netscape Directory Server, Version 4.0; 1998; pp. 299-328; Netscape Communications Corporation, Mountain View CA , USA.
Netscape Communications Corporation; "Chapter 7—Planning Replication"; Deployment Guide—Netscape Directory Server, Version 4.0; 1998; pp. 93-115; Netscape Communications Corporation, Mountain View CA, USA.
Douglas B. Terry, Karin Petersen, Mike J. Spreitzer, and Marvin M. Theimer; "The Case for Non-trasparent Replication: Examples from Bayou"; pp. 1-10; Computer Science Laboratory, Xerox Palo Alto Research Center, Palo Alto, CA; USA.
Ed Reed, Ellen Stokes, and Russel Weiser; "LDAP Replication Architecture"; www.stanford.edu/hodges . . . ; Apr. 17, 1998; pp. 1-11; The Internet Society; California; USA.

* cited by examiner

Primary Examiner—Greta Robinson
Assistant Examiner—Harold E. Dodds, Jr.
(74) Attorney, Agent, or Firm—Osha ·X· Liang LLP (57) ABSTRACT

A directory server includes a supplier server, a consumer server in communication with the supplier server, a plurality of pluggable services that manage replication of data contained within the directory server from the supplier server to the consumer server, and a change log maintained on the consumer server of data replicated to the consumer server. The replication of data is managed by the plurality of pluggable services using the change log.

28 Claims, 7 Drawing Sheets

| Open Digital Marketplaces/Applications 40 |

| Portal Services 42 | | | | |
|---|---|---|---|---|
| Knowledge Management 50 | Security 52 | Personalization 54 | Aggregation 56 | Presentation 58 |

| Communication Services 44 | | | | |
|---|---|---|---|---|
| Web Mail 60 | Calendar 62 | Wireless 64 | Instant Messaging 66 | Unified Messaging 68 |

| Web, Application, and Integration Services 46 | | | | |
|---|---|---|---|---|
| Web Server 70 | Application Server 72 | B2B Integration 74 | EAI Integration 76 | Business Process Automation 78 |

| Unified User Management Services 48 | | | | |
|---|---|---|---|---|
| Directory Server 80 | Meta Directory 82 | Delegated Administration 84 | PKI 86 | Policy 88 |

Internet Service Deployment Platform

| Operating System 30 |

| Network & Systems Infrastructure 32 |

Entry 124

| Attribute Types 120 | Attribute Values 122 |
|---:|:---|
| cn: | Barbara Jensen<br>Babs Jensen |
| sn: | Jensen |
| telephonenumber: | +1 408 555 1212 |
| mail: | babs@airius.com |

REPLICATION ARCHITECTURE FOR A DIRECTORY SERVER

BACKGROUND OF INVENTION

The most fundamental program resident on any computer is the operating system (OS). Various operating systems exist in the market place, including Solaris™ from Sun Microsystems Inc., Palo Alto, Calif. (Sun Microsystems), MacOS from Apple Computer, Inc., Cupertino, Calif., Windows® 95/98 and Windows NT®, from Microsoft Corporation, Redmond, Wash., UNIX, and Linux. The combination of an OS and its underlying hardware is referred to herein as a "traditional platform". Prior to the popularity of the Internet, software developers wrote programs specifically designed for individual traditional platforms with a single set of system calls and, later, application program interfaces (APIs). Thus, a program written for one platform could not be run on another. However, the advent of the Internet made cross-platform compatibility a necessity and a broader definition of a platform has emerged. Today, the original definition of a traditional platform (OS/hardware) dwells at the lower layers of what is commonly termed a "stack," referring to the successive layers of software required to operate in the environment presented by the Internet and World Wide Web.

Figure 1:
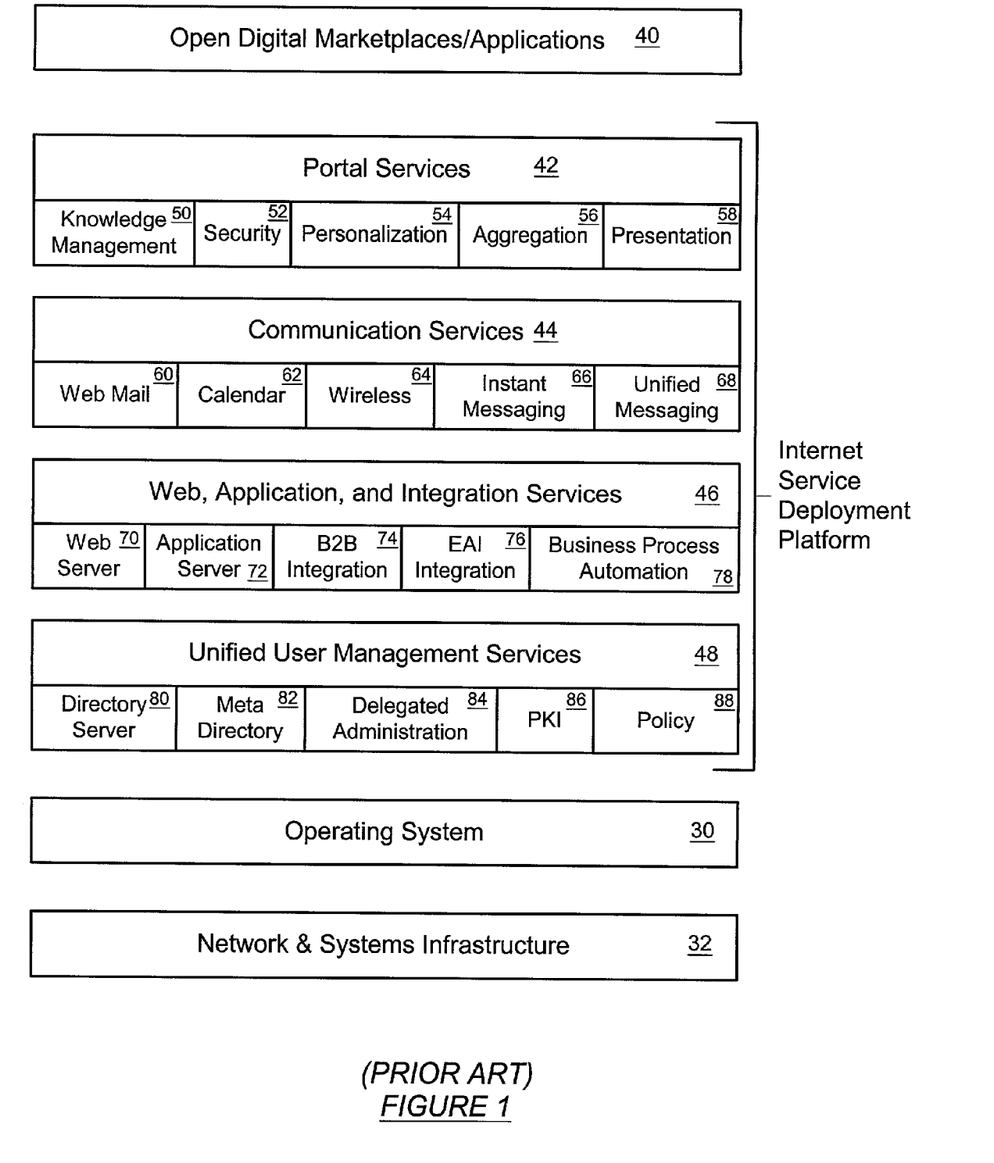
FIG. 1 illustrates a block diagram of iPlanet™ Internet Service Development Platform.

Effective programming at the application level requires the platform concept to be extended all the way up the stack, including all the new elements introduced by the Internet. Such an extension allows application programmers to operate in a stable, consistent environment.

iPlanet™ E-commerce Solutions, a Sun Microsystems|Netscape Alliance, has developed a net-enabling platform shown in FIG. 1 called the Internet Service Deployment Platform (ISDP) (28). ISDP (28) gives businesses a very broad, evolving, and standards-based foundation upon which to build an e-enabled solution.

A core component of the ISDP (28) is iPlanet™ Directory Server (80), a Lightweight Directory Access Protocol (LDAP)-based solution that can handle more than 5,000 queries per second. iPlanet™ Directory Server (iDS) provides a centralized directory service for an intranet or extranet while integrating with existing systems. The term "directory service" refers to a collection of software, hardware, and processes that store information and make the information available to users. The directory service generally includes at least one instance of the iDS and one or more directory client program(s). Client programs can access names, phone numbers, addresses, and other data stored in the directory.

The iDS is a general-purpose directory that stores all information in a single, network-accessible repository. The iDS provides a standard protocol and application programming interface (API) to access the information contained by the iDS. The iDS provides global directory services, meaning that information is provided to a wide variety of applications. Until recently, many applications came bundled with a proprietary database. While a proprietary database can be convenient if only one application is used, multiple databases become an administrative burden if the databases manage the same information. For example, in a network that supports three different proprietary e-mail systems where each system has a proprietary directory service, if a user changes passwords in one directory, the changes are not automatically replicated in the other directories. Managing multiple instances of the same information results in increased hardware and personnel costs.

The global directory service provides a single, centralized repository of directory information that any application can access. However, giving a wide variety of applications access to the directory requires a network-based means of communicating between the numerous applications and the single directory. The iDS uses LDAP to give applications access to the global directory service.

LDAP is the Internet standard for directory lookups, just as the Simple Mail Transfer Protocol (SMTP) is the Internet standard for delivering e-mail and the Hypertext Transfer Protocol (HTTP) is the Internet standard for delivering documents. Technically, LDAP is defined as an on-the-wire bit protocol (similar to HTTP) that runs over Transmission Control Protocol/Internet Protocol (TCP/IP). LDAP creates a standard way for applications to request and manage directory information.

Figure 2:
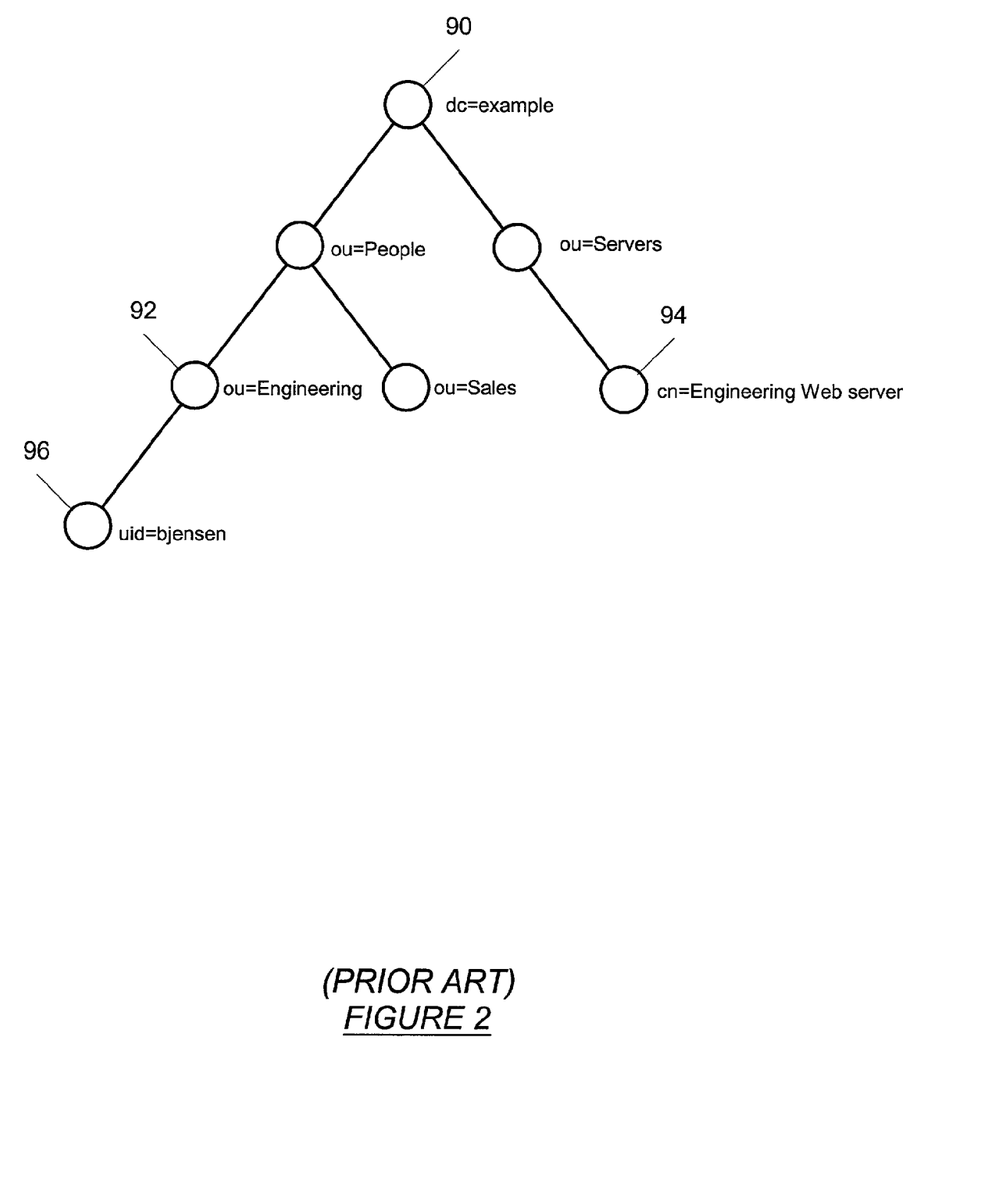
FIG. 2 illustrates part of a typical directory.

An LDAP-compliant directory, such as the iDS, leverages a single, master directory that owns all user, group, and access control information. The directory is hierarchical, not relational, and is optimized for reading, reliability, and scalability. This directory becomes the specialized, central repository that contains information about objects and provides user, group, and access control information to all applications on the network. For example, the directory can be used to provide information technology managers with a list of all the hardware and software assets in a widely spanning enterprise. Most importantly, a directory server provides resources that all applications can use, and aids in the integration of these applications that have previously functioned as stand-alone systems. Instead of creating an account for each user in each system the user needs to access, a single directory entry is created for the user in the LDAP directory. FIG. 2 shows a portion of a typical directory with different entries corresponding to real-world objects. The directory depicts an organization entry (90) with the attribute type of domain component (dc), an organizational unit entry (92) with the attribute type of organizational unit (ou), a server application entry (94) with the attribute type of common name (cn), and a person entry (96) with the attribute type of user ID (uid). All entries are connected by the directory.

Figure 3:
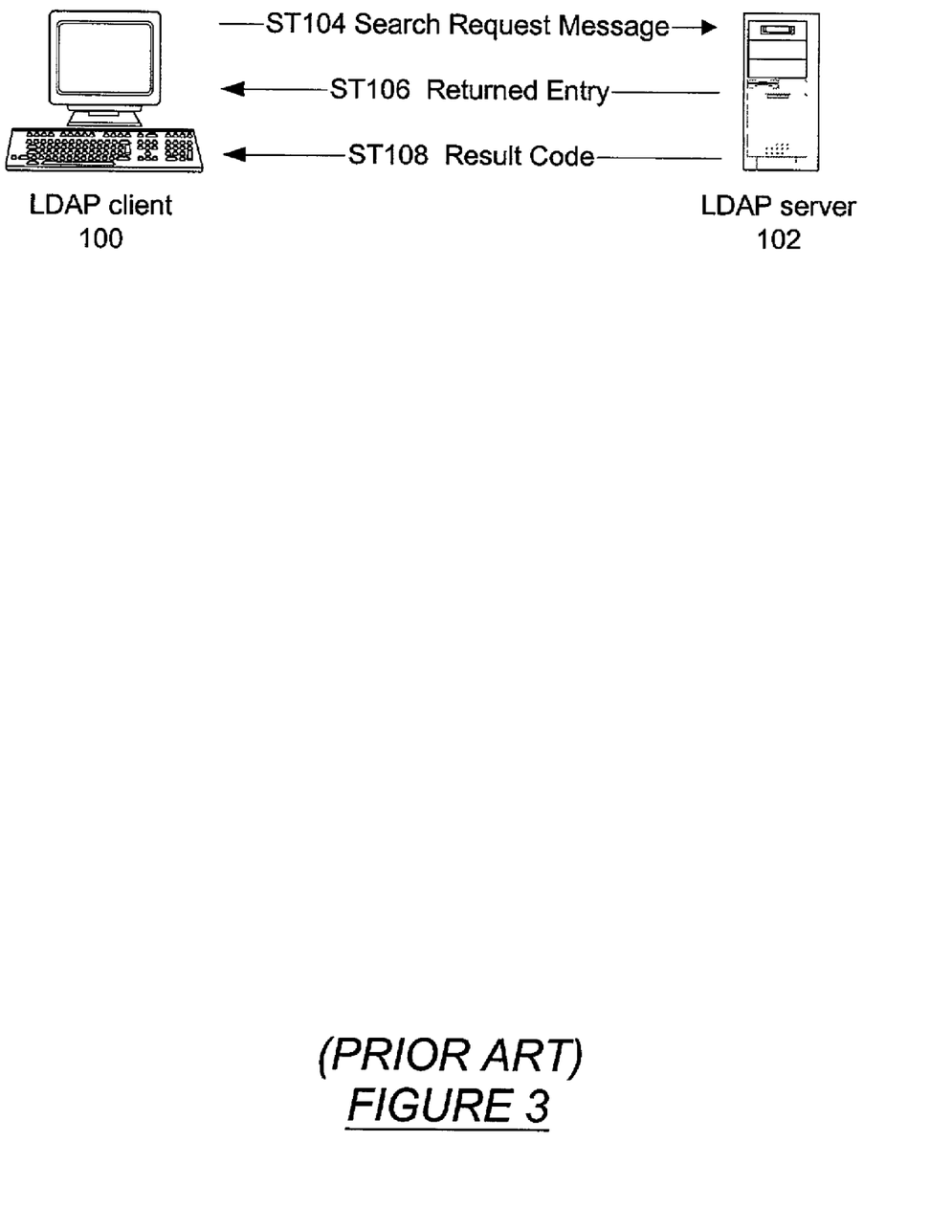
FIG. 3 illustrates the LDAP protocol used for a simple request.

Understanding how LDAP works starts with a discussion of an LDAP protocol. The LDAP protocol is a message-oriented protocol. The client constructs an LDAP message containing a request and sends the message to the server. The server processes the request and sends a result, or results, back to the client as a series of LDAP messages. Referring to FIG. 3, when an LDAP client (100) searches the directory for a specific entry, the client (100) constructs an LDAP search request message and sends the message to the LDAP server (102) (step 104). The LDAP server (102) retrieves the entry from the database and sends the entry to the client (100) in an LDAP message (step 106). A result code is also returned to the client (100) in a separate LDAP message (step 108).

LDAP-compliant directory servers like the iDS have nine basic protocol operations, which can be divided into three categories. The first category is interrogation operations, which include search and compare operators. These interrogation operations allow questions to be asked of the directory. The LDAP search operation is used to search the directory for entries and retrieve individual directory entries. No separate LDAP read operation exists. The second category is update operations, which include add, delete, modify, and modify distinguished name (DN), i.e., rename, operators. A DN is a unique, unambiguous name of an entry in LDAP. These update operations allow the update of information in the directory. The third category is authentication and control operations, which include bind, unbind, and abandon operators.

The bind operator allows a client to identify itself to the directory by providing an identity and authentication credentials. The DN and a set of credentials are sent by the client to the directory. The server checks whether the credentials are correct for the given DN and, if the credentials are correct, notes that the client is authenticated as long as the connection remains open or until the client re-authenticates. The unbind operation allows a client to terminate a session. When the client issues an unbind operation, the server discards any authentication information associated with the client connection, terminates any outstanding LDAP operations, and disconnects from the client, thus closing the TCP connection. The abandon operation allows a client to indicate that the result of an operation previously submitted is no longer of interest. Upon receiving an abandon request, the server terminates processing of the operation that corresponds to the message ID.

In addition to the three main groups of operations, the LDAP protocol defines a framework for adding new operations to the protocol via LDAP extended operations. Extended operations allow the protocol to be extended in an orderly manner to meet new marketplace needs as they emerge.

Figure 4:
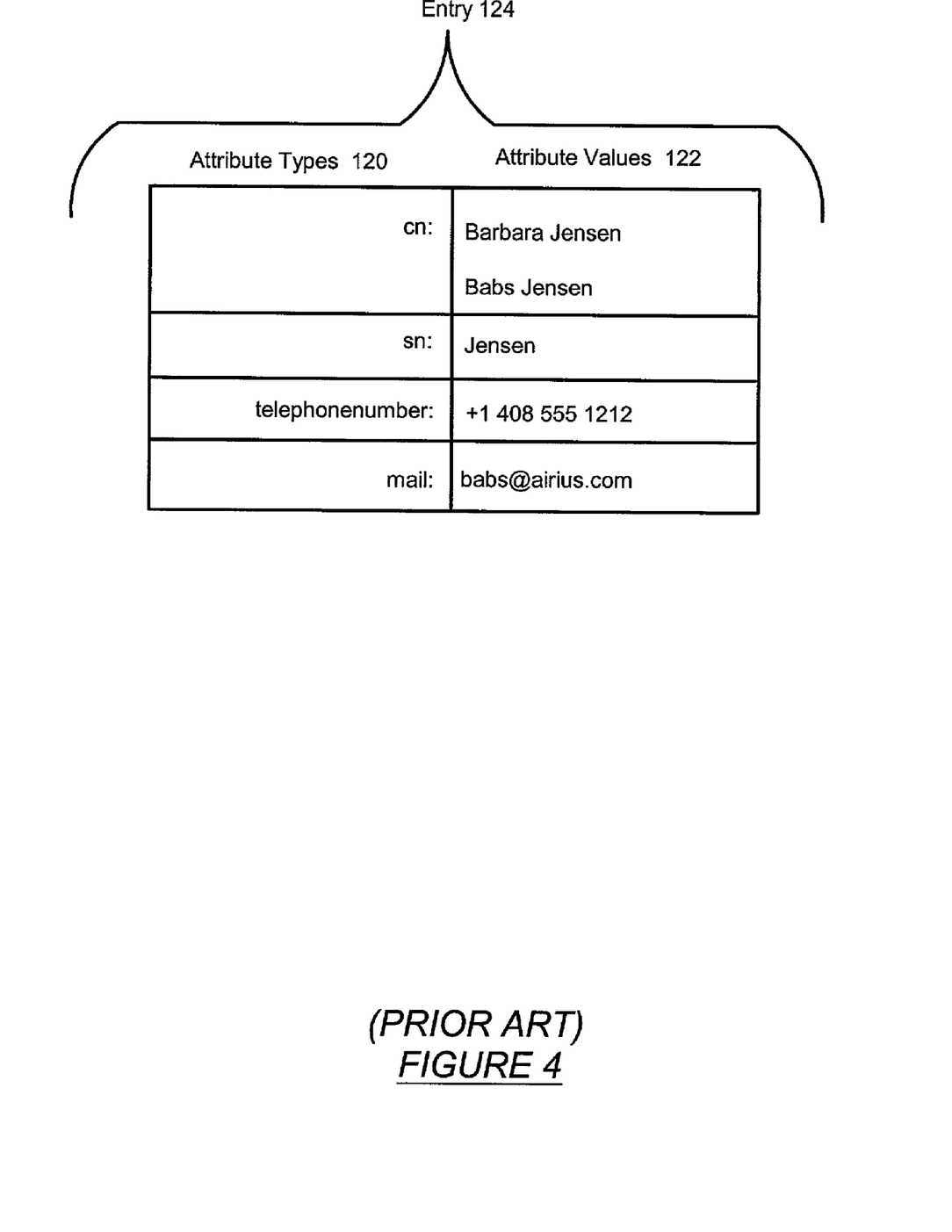
FIG. 4 illustrates a directory entry showing attribute types and values.

The basic unit of information in the LDAP directory is an entry, a collection of information about an object. Entries are composed of a set of attributes, each of which describes one particular trait of an object. Attributes are composed of an attribute type (e.g., common name (cn), surname (sn), etc.) and one or more values. FIG. 4 shows an exemplary entry (124) showing attribute types (120) and values (122). Attributes may have constraints that limit the type and length of data placed in attribute values (122). A directory schema places restrictions on the attribute types (120) that must be, or are allowed to be, contained in the entry (124).

SUMMARY OF INVENTION

In general, in one aspect, the invention involves a directory server. The directory server comprises a supplier server, a consumer server in communication with the supplier server, a plurality of pluggable services that manage replication of data contained within the directory server from the supplier server to the consumer server, and a change log maintained on the consumer server of data replicated to the consumer server. Replication of data is managed by the plurality of pluggable services using the change log.

In general, in one aspect, the invention involves a method for replicating data in a directory server having a supplier and a consumer server. The method comprises determining a need to replicate data in the directory server, using a plurality of services to manage replication of data contained within the directory server from the supplier server to the consumer server, maintaining a change log of data replicated to the consumer server, and updating data replicated to the consumer server.

In general, in one aspect, the invention involves a method for replicating data in a directory server having a supplier and a consumer server. The method comprises determining a need to replicate data in the directory server, using a plurality of services to manage replication of data contained within the directory server from the supplier server to the consumer server, maintaining a change log of data replicated to the consumer server, updating data replicated to the consumer server, and resolving conflicts of the replicated data using a time stamp to determine the consumer server holding the most recent version of the replicated data.

In general, in one aspect, the invention involves an apparatus for replicating data in a directory server having a supplier and a consumer server. The apparatus comprises means for determining a need to replicate data in the directory server, means for using a plurality of services to manage replication of data contained within the directory server from the supplier server to the consumer server, means for maintaining a change log of data replicated to the consumer server, and means for updating data replicated to the consumer server.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

Figure 5:
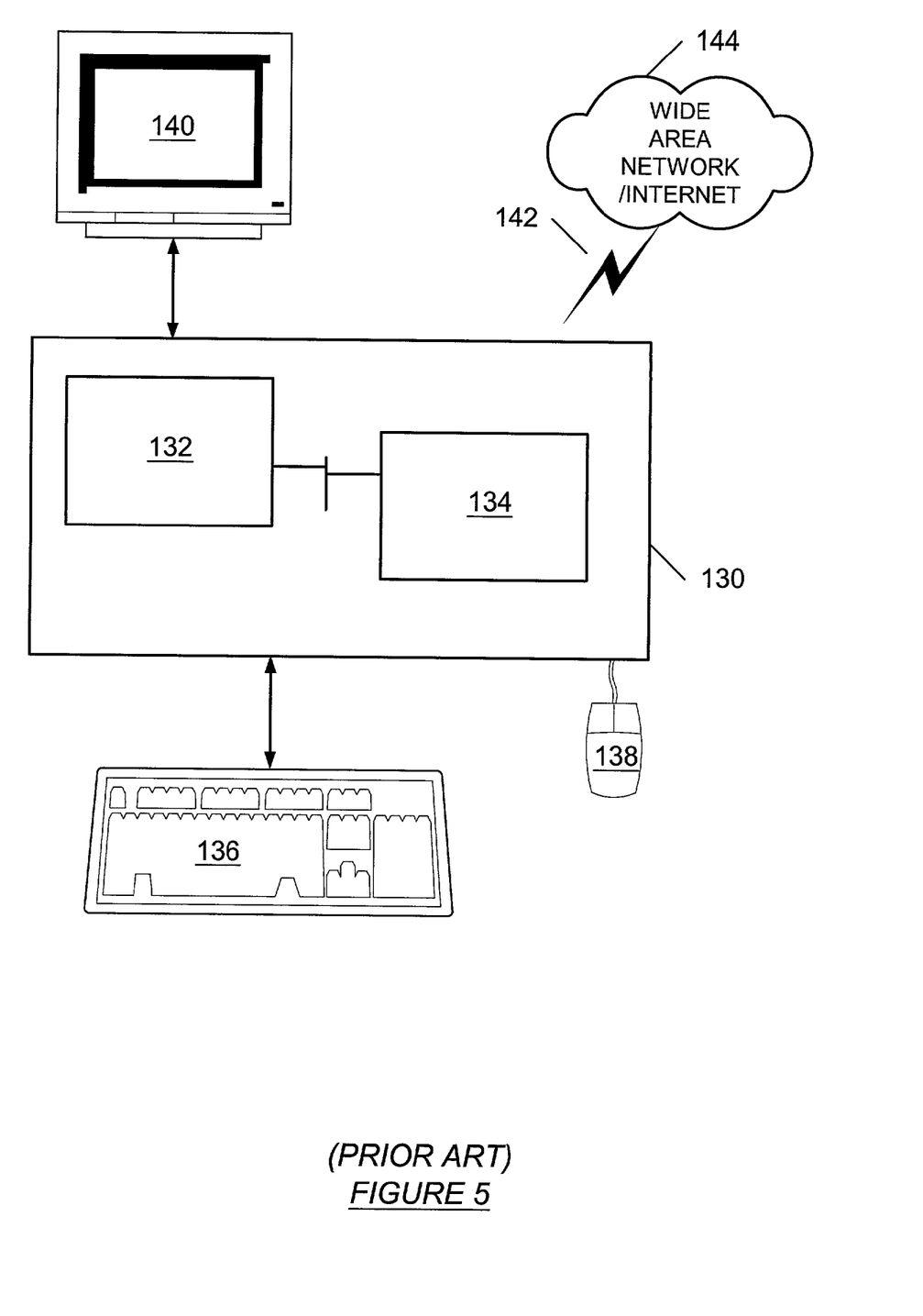
FIG. 5 illustrates a typical computer with components.

The invention described here may be implemented on virtually any type computer regardless of the traditional platform being used. For example, as shown in FIG. 5, a typical computer (130) has a processor (132), memory (134), among others. The computer (130) has associated therewith input means such as a keyboard (136) and a mouse (138), although in an accessible environment these input means may take other forms. The computer (130) is also associated with an output device such as a display (140), which also may take a different form in a given accessible environment. The computer (130) is connected via a connection means (142) to a wide area network (144), such as the Internet.

A basic directory tree, also known as directory information tree (DIT), mirrors a tree model used by most file systems, with a tree root, or first entry, appearing at the top of a hierarchy. At installation, the iDS creates a default directory tree as show in FIG. 6. The default directory tree contains a root (160) (dc=root, dc=suffix) and two entries. A first entry is o=NetscapeRoot (162). The data contained by this subtree is used by the iPlanet™ Administration Server. The iPlanet™ Administration Server handles authentication, and all actions that cannot be performed through LDAP (such as starting or stopping). A second entry is cn=config (164). This subtree contains iDS configuration information.

Figure 6:
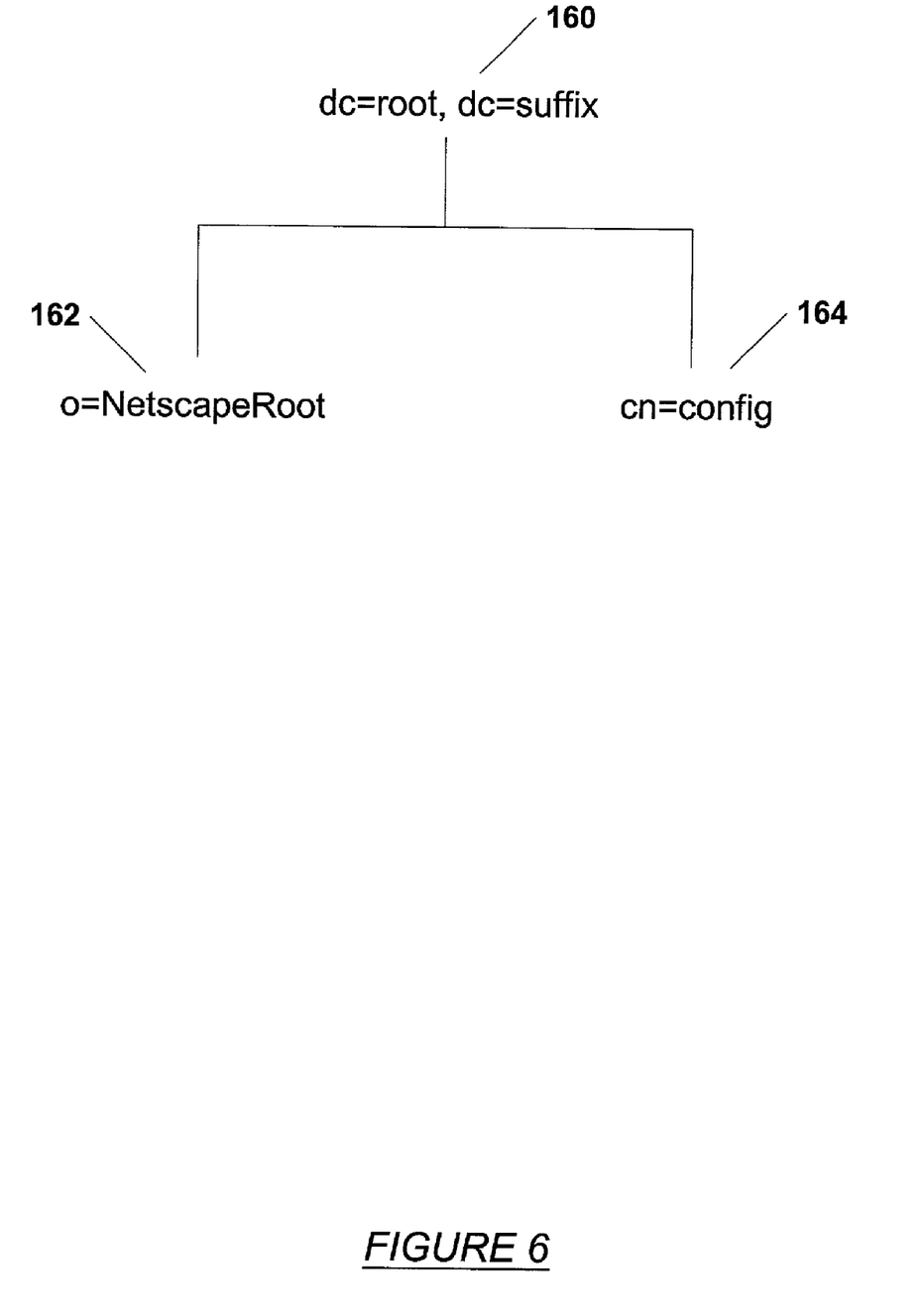
FIG. 6 illustrates a default directory tree for iPlanet™ Directory Server in accordance with one or more embodiments of the present invention.

The initial directory tree contains one subtree reserved for the server itself and one subtree for iPlanet™ Administration Server. All the iDS typically contain the cn=config data, but only one (the first server installed) contains the o=NetscapeRoot information. The default directory can be built upon to add any data relevant to a directory installation.

Replication is the mechanism that automatically copies directory data from one directory server to another. Replicating a directory's contents increases the availability and performance of the directory and addresses the physical and geographical location of stored data. Using replication serves to copy any directory information tree or subtree (stored in a database) between servers. The directory server that holds the master copy of the information automatically copies any updates to all replicas. Replication enables the provision of a highly available directory service and the geographically distribution of data.

By replicating directory information trees to multiple servers, the directory is available even if some hardware, software, or network problem prevents directory client applications from accessing a particular directory server. Clients may also consult another replica. Note that to allow clients uninterrupted access to an updateable replica, a multi-master replication environment is needed, where two or more servers hold a copy of the same read-write replica, and each server maintains a change log for the replica. Modifications made on one server are automatically replicated to the other server. In case of conflict, a time stamp is used to determine which server holds the most recent version. By replicating the directory tree across servers, the access load on any given machine may be reduced, thereby improving server response time. Replication makes it possible to own and manage a set of data locally while sharing the set of data with other directory servers.

A server that holds a replica that is copied to a replica on a different server is called a supplier server for that replica. A server that holds a replica that is copied from a different server is called a consumer server for that replica.

Figure 7:
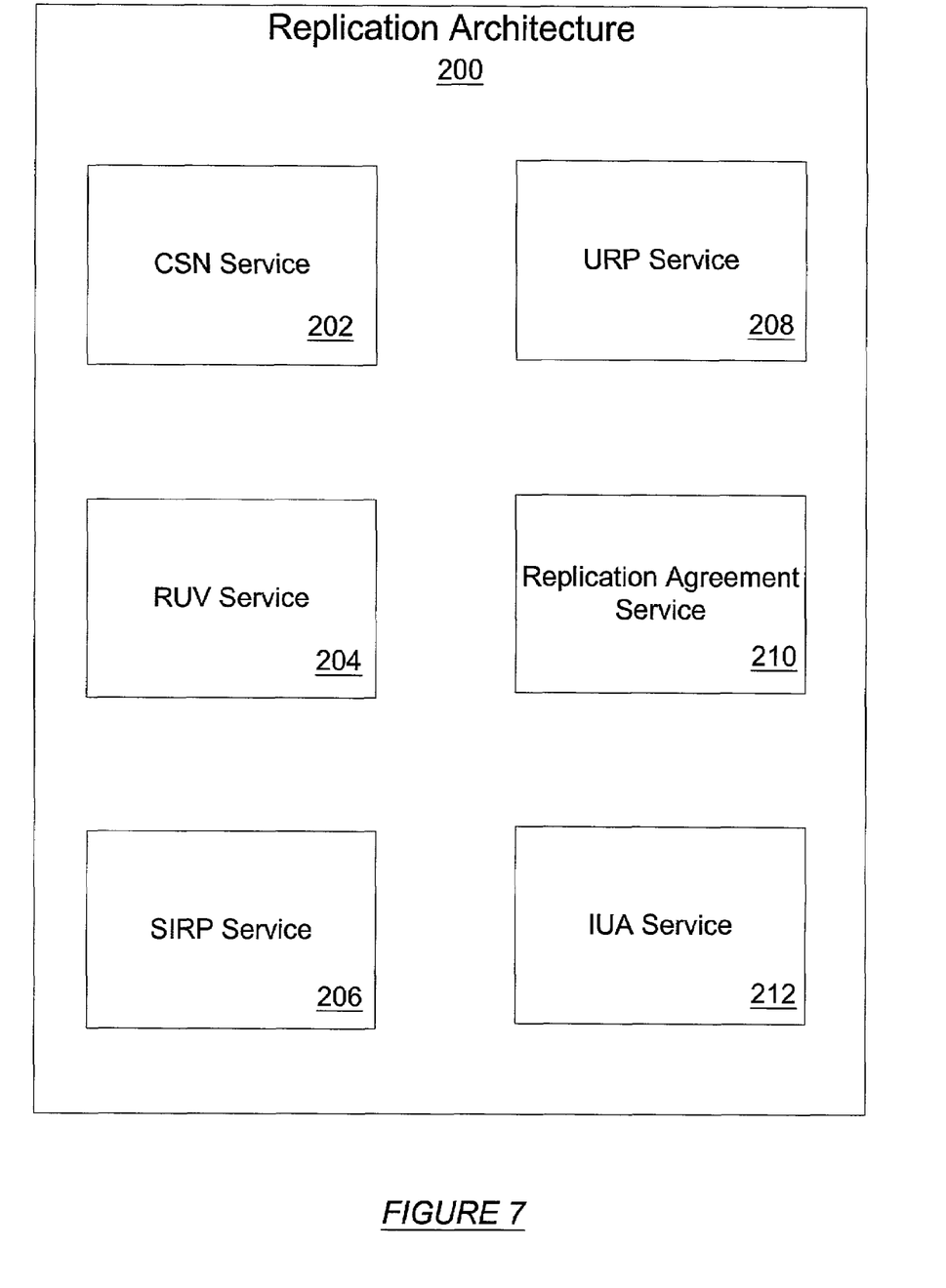
FIG. 7 illustrates a block diagram of the replication architecture in accordance with one or more embodiments of the present invention.

A replication architecture (RA) for a directory server is a group of services, functions, etc. that aid in the act of replication, e.g., copying directory trees or subtrees from supplier servers to consumer servers. FIG. 7 illustrates a diagram of the RA services within the RA structure. The RA (200) includes a Change Sequence Number (CSN) service (202), an Update Resolution Procedure (URP) Service (208), a Replica Update Vector (RUV) service (204), a Replication Agreement Service (210), a Server Initiated Replication Protocol (SIRP) Service (206), a Incremental Update Algorithm (IUA) Service (212), and a UniqueId service (214).

One service of the RA is the CSN Service. The CSN service creates, for each attribute value in each entry of the DIT, a unique combination of four numbers used to unambiguously determine the order in which update operations were received from clients. An URP service is then used to determine the correct ordering of various operations. The URP service uses the CSN service to determine the ordering of the operations by comparing the supplier server's CSN's to the consumer server's CSN's. CSN's provide a global logical time, which gives a basis for ordering operations that were initially performed at different servers.

Another service is the RUV service. The RUV service indicates how up-to-date one replica is with respect to all other replicas. The RUV includes one CSN for each known replica that describes the latest update received from that replica. When one replica sends changes to another, the replica consults the consumer server's RUV and the RUV service determines the smallest set of updates that need to be sent to bring the replica up-to-date.

Another service is the Replication Agreement service. The Replication Agreement service is a DIT entry that describes the relationship between a supplier server and a single consumer server. Information present in the Replication Agreement service includes a portion of the DIT being replicated, a bind method and credentials used to authenticate to the consumer server, a replication schedule, etc.

A further service is the SIRP. The SIRP carries the state information for the URP service. The IUA service compares the supplier server and consumer server RUV's to properly order the update sequence from an iDS Change Log, which is a sequence of change records. The UniqueId service assigns a unique identifier to each entry added by the client. The UniqueId identifies the entry even if its distinguished name changes. The state information is information for an entry that includes the UniqueId and the set of CSNs for that entry.

While the prior discussion has involved incremental update protocols, one skilled in the art may appreciate that other methods exist, such as a total update protocol (TUP). Generally, the TUP is used to initialize or re-initialize a replica. The TUP carries all of the DIT entries along with the associated state information for each entry, and is sent as a series of LDAP extended operations.

The IUA reads the consumer's RUV, processes it through the changelog, and sends to the consumer any changes that the consumer has not yet received. All changes are sent even if the changes originated at some other replica. Because all changes are sent, transitive replication topologies are allowed. For example, suppose A & B are both updateable replicas. A replicates to B which replicates to consumer C. A does not directly replicate to C, but since B passes along changes originally received by A, C gets all changes originated at A and B.

Advantages of the present invention may include one or more of the following. An advantage of the RA services is that they provide additional functionality and control for each operation. Another advantage is that the RA services provide more efficient updates of the DIT. A further advantage of the RA is that it allows construction of replication environments that function even in the face of unavailability of an updateable replica. Another advantage of the RA is that it allows more flexible replication topologies. A further advantage of the RA is that in a multi-mastered environment, clients need only have connectivity to a single updateable replica. Those skilled in the art will appreciate that the present invention may have further advantages.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A directory server comprising:
   a supplier server;
   a consumer server in communication with the supplier server;
   a plurality of pluggable services that manage replication of data contained within the directory server from the supplier server to the consumer server; and
   a change log maintained on the consumer server of data replicated to the consumer server;

wherein replication of data is managed by the plurality of pluggable services using the change log, and wherein the plurality of pluggable services comprises an incremental update algorithm service comparing a first replica update vector of the supplier server and a second replica update vector of the consumer server to order an update sequence from the change log.

2. The directory server of claim 1, further comprising:

a directory information tree copied between the supplier server and the consumer server;

wherein replication of data is managed by the plurality of pluggable services using the directory information tree.

3. The directory server of claim 1, further comprising:

a directory information subtree copied between the supplier server and the consumer server;

wherein replication of data is managed by the plurality of pluggable services using the directory information subtree.

4. The directory server of claim 2, wherein the plurality of pluggable services comprises a change sequence number service creating a unique combination of numbers used to determine ordering of an update operation for an attribute value in an entry in the directory information tree.

5. The directory server of claim 1, wherein the plurality of pluggable services comprises an update resolution procedure service determining ordering of operations by comparing a first change sequence number of the supplier server to a second change sequence number of the consumer server.

6. The directory server of claim 1, wherein the plurality of pluggable services comprises a replica update vector service determining a set of updates to be sent to a data replica by consulting a replica update vector for the consumer server.

7. The replication system of claim 6, wherein the replica update vector comprises a change sequence number for every data replica.

8. The directory server of claim 2, wherein the plurality of pluggable services comprises a replication agreement service comprising an entry in the directory information tree describing a relationship between the supplier server and the consumer server.

9. The directory server of claim 1, wherein the plurality of pluggable services comprises a server-initiated replication protocol service to store and update state information.

10. The replication system of claim 9, wherein state information comprises a uniqueid and a plurality of change sequence numbers for an entry.

11. The directory server of claim 1, wherein the plurality of pluggable services comprises a uniqueid service assigning a unique identifier to an entry added by a client.

12. A method for replicating data in a directory server having a supplier and a consumer server, comprising:

determining a need to replicate data in the directory server;

using a plurality of services to manage replication of data contained within the directory server from the supplier server to the consumer server, wherein the plurality of services comprises an incremental update algorithm service comparing a first replica update vector of the supplier server and a second replica update vector of the consumer server to order an update sequence from the change log;

maintaining a change log of data replicated to the consumer server; and updating data replicated to the consumer server.

13. The method of claim 12, further comprising:

resolving conflicts of the replicated data using a time stamp to determine the consumer server holding the most recent version of the replicated data.

14. The method of claim 12, wherein replication of data is managed by the plurality of pluggable services using a directory information tree.

15. The method of claim 12 wherein replication of data is managed by the plurality of pluggable services using a directory information subtree.

16. The method of claim 12, wherein updating data is performed with a incremental update protocol.

17. The method of claim 12, wherein updating data is performed with a total update protocol.

18. The method of claim 14, wherein the plurality of services comprises a change sequence number service creating a unique combination of numbers used to determine ordering of an update operation for an attribute value in an entry in the directory information tree.

19. The method of claim 12, wherein the plurality of services comprises an update resolution procedure service determining ordering of operations by comparing a first change sequence number of the supplier server to a second change sequence number of the consumer server.

20. The method of claim 12, wherein the plurality of services comprises a replica update vector service determining a set of updates to be sent to a data replica by consulting a replica update vector for the consumer server.

21. The method of claim 20, wherein the replica update vector comprises a change sequence number for every data replica.

22. The method of claim 14, wherein the plurality of services comprises a replication agreement service comprising an entry in the directory information tree describing a relationship between the supplier server and the consumer server.

23. The method of claim 12, wherein the plurality of services comprises a server-initiated replication protocol service to store and update state information.

24. The method of claim 23, wherein state information comprises a uniqueid and a plurality of change sequence numbers for an entry.

25. The method of claim 12, wherein the plurality of services comprises an incremental update algorithm service comparing a first replica update vector of the supplier server and a second replica update vector of the consumer server to order an update sequence from the change log.

26. The method of claim 12, wherein the plurality of services comprises a uniqueid service assigning a unique identifier to an entry added by a client.

27. A method for replicating data in a directory server having a supplier and a consumer server, comprising:

determining a need to replicate data in the directory server;

using a plurality of services to manage replication of data contained within the directory server from the supplier server to the consumer server, wherein the plurality of services comprises an incremental update algorithm service comparing a first replica update vector of the supplier server and a second replica update vector of the consumer server to order an update sequence from the change log;

maintaining a change log of data replicated to the consumer server;

updating data replicated to the consumer server; and resolving conflicts of the replicated data using a time stamp to determine the consumer server holding the most recent version of the replicated data.

28. An apparatus for replicating data in a directory server having a supplier and a consumer server, comprising:

means for determining a need to replicate data in the directory server;

means for using a plurality of services to manage replication of data contained within the directory server from the supplier server to the consumer server, wherein the plurality of services comprises an incremental update algorithm service comparing a first replica update vector of the supplier server and a second replica update vector of the consumer server to order an update sequence from the change log;

means for maintaining a change log of data replicated to the consumer server; and means for updating data replicated to the consumer server.

* * * * *